United States Patent [19]  [11] 4,104,706
Hanson et al. [45] Aug. 1, 1978

[54] PHOTOFLASH LAMP ARRAY HAVING CONDUCTIVE REFLECTOR

[75] Inventors: James M. Hanson, Euclid; Stanley S. Palagyi, Conneaut; Gerald W. Povall, Highland Heights, all of Ohio

[73] Assignee: General Electric Company, Schenectady, N.Y.

[21] Appl. No.: 805,317

[22] Filed: Jun. 10, 1977

Related U.S. Application Data

[63] Continuation of Ser. No. 655,005, Feb. 4, 1976, abandoned.

[51] Int. Cl.$^2$ .............................................. G03B 15/02
[52] U.S. Cl. ........................................ 362/10; 362/11; 362/13; 362/184; 362/241
[58] Field of Search ................... 240/1.3; 362/11, 10, 362/13, 184, 241

[56] References Cited

U.S. PATENT DOCUMENTS

| 3,941,992 | 3/1976 | Blount et al. | 240/1.3 |
| 3,980,875 | 9/1976 | Cote | 240/1.3 |

Primary Examiner—Stephen J. Lechert, Jr.
Attorney, Agent, or Firm—Norman C. Fulmer; Lawrence R. Kempton; Frank L. Neuhauser

[57] ABSTRACT

A photoflash lamp array comprising a plurality of flash lamps having lead-in wires connected to a circuit board, and a reflector unit positioned between the lamps and the circuit board. The reflector unit is made of plastic having an electrically conductive reflecting coating on its front surface, and the reflector unit is shaped to provide openings so that the conductive coating is adjacent to or touching electrical ground areas of circuitry on the circuit board, whereby the reflector unit functions to dissipate electrostatic charges thus preventing accidental flashing of lamps.

12 Claims, 6 Drawing Figures

U.S. Patent  Aug. 1, 1978  4,104,706
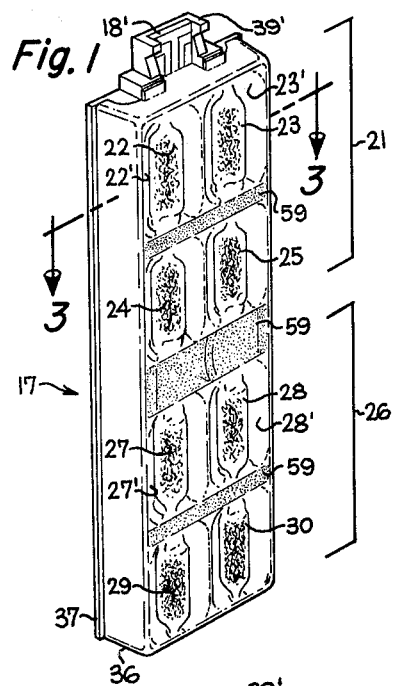
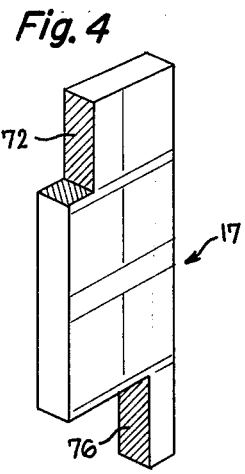
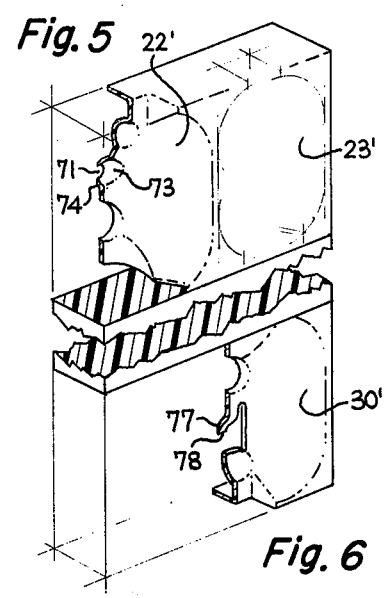
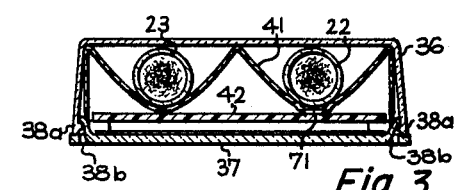
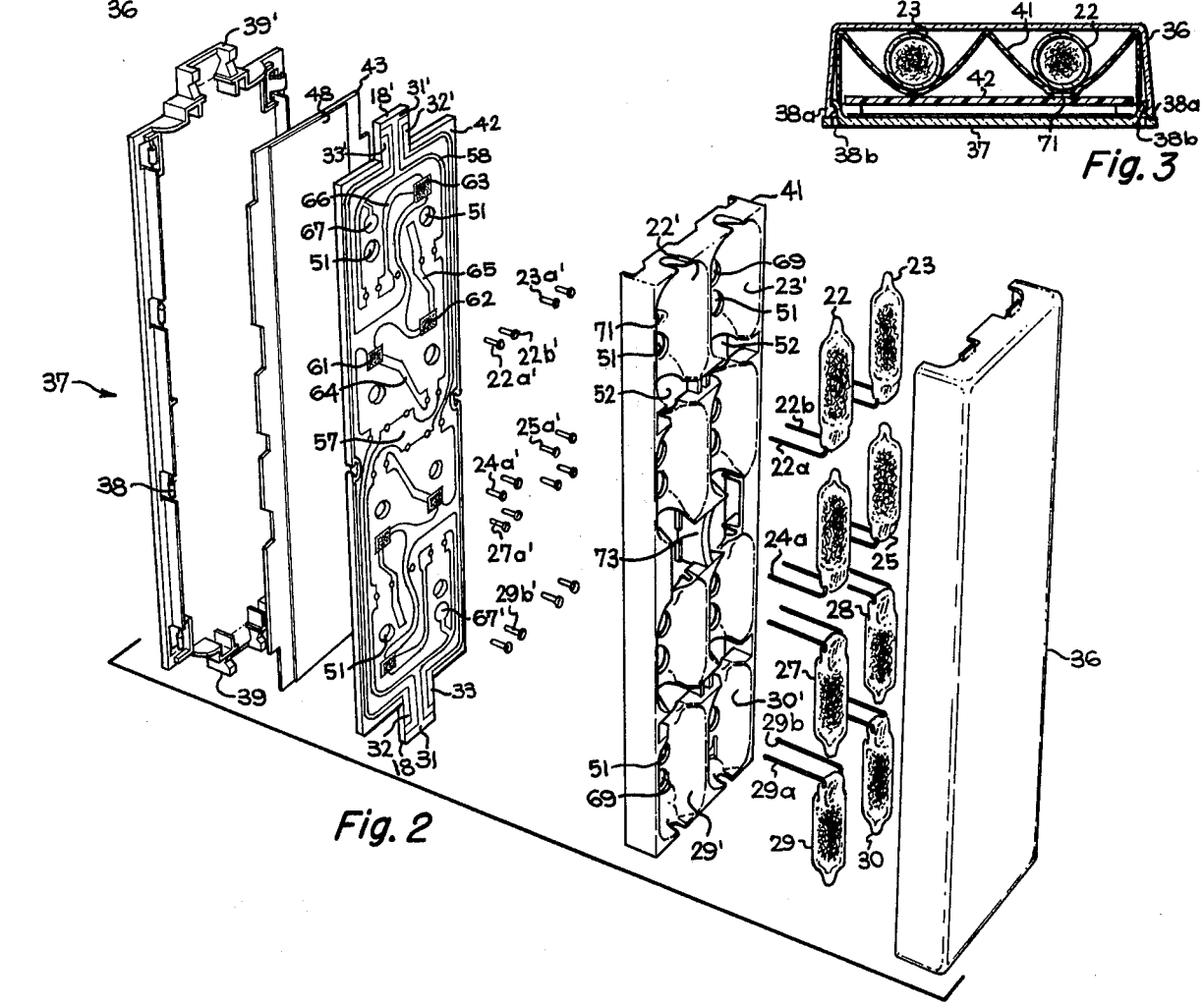

PHOTOFLASH LAMP ARRAY HAVING CONDUCTIVE REFLECTOR

CROSS-REFERENCES TO RELATED APPLICATIONS

This is a continuation of patent application Ser. No. 655,005, filed Feb. 4, 1976, abandoned.

Ser. No. 485,422, filed July 3, 1974, Paul T. Cote, "Multiple Flash Lamp Unit," now U.S. Pat. No. 3,980,875 and assigned the same as this invention.

Ser. No. 485,460, filed July 3, 1974, Paul T. Cote, "Protective Terminal for Multiple Flash Lamp Unit," now U.S. Pat. No. 3,980,876 and assigned the same as this invention.

Ser. No. 509,410, filed Sept. 26, 1974, James M. Hanson, "Photoflash Lamp Array Having Electrically Connected Reflector," now U.S. Pat. No. 3,935,442 and assigned the same as this invention.

Ser. No. 655,055, filed Feb. 4, 1976, James M. Hanson and Gerald W. Povall, "Photoflash Lamp Array Having Conductive Reflector," now U.S. Pat. No. 4,060,721 assigned the same as this invention.

BACKGROUND OF THE INVENTION

The invention is in the field of multiple photoflash lamp units, such as planar arrays.

The above-referenced patent applications disclose multiple flash lamp arrays comprising a plurality of flash lamps having their lead-in wires connected to a circuit board provided with switching circuitry for causing sequential flashing of the lamps, and reflectors are positioned between the lamps and the circuit board. As is particularly disclosed in the above-referenced Cote patent applications, the reflectors for the lamps can be made as a single reflector member or unit shaped to provide multiple individual reflectors for the lamps. This reflector member preferably is electrically conductive, such as by being made of metal or metal-coated plastic, and is electrically connected to an electrical "ground" portion of the circuitry on the circuit board. Thus, the reflector member functions as an electrical shield and also increases the stray capacitance to earth ground (or space) of the electrical "ground" of the circuitry, for dissipating electrostatic charges and thus reducing the possibility of accidental flashing of lamps by electrostatic voltage charge on a person or object touching the array, which accidental flashing is particularly prone to occur if the lamps are high voltage types requiring a firing voltage of 1000 or 2000 volts, for example, at low energy. To help achieve the foregoing, the flash array connector is arranged so that an electrical ground terminal thereon is more readily touchable by persons or objects than are other terminals on the connector.

The above-referenced Hanson patent application discloses an arrangement for electrically connecting the conductive reflector to a conductive area on the circuit board, comprising a U-shaped conductive clip member clipped to a web of the reflector unit and extending against the conductive area on the circuit board.

SUMMARY OF THE INVENTION

Objects of the invention are to provide an improved flash array construction and to provide an improved electrical connection between a reflector member and a circuit board, which is feasible and economical to manufacture.

The invention comprises, briefly and in a preferred embodiment, a multiple flash lamp array containing a plurality of flash lamps having lead-in wires connected to a circuit board carrying circuitry for flashing the lamps. An electrically conductive reflector unit is positioned between the lamps and the circuit board. The reflector unit comprises a shaped plastic member having electrically conductive reflecting material on its front surface facing the lamps. In accordance with the invention, the reflector unit is provided with openings shaped to bring its front conductive surface very close to or in contact with one or more conductive areas on the circuit board. In one embodiment, the reflector unit comprises an opening through the wall thereof at a location where the reflector unit is adjacent to or against an aforesaid conductive area on the circuit board. This brings the conductive material on the front surface of the reflector unit as near to the circuit board conductive area as approximately the thickness of the reflector wall at the edge of the opening. Preferably, the front surface of the reflector is tapered rearwardly around the opening so as to bring the reflector front surface conductive material closer to the circuit board conductive area. In a preferred modification, the rear surface of the reflector is shaped to have a rim projecting rearwardly around the opening, and the rim is provided with a sharp edge so as to press into the circuit board conductive area and bring the reflector conductive material closer to, and in some cases in direct contact with, the circuit board conductive area.

In another preferred embodiment of the invention, each of the aforesaid shaped areas of the reflector comprises a tab integral with the reflector and resiliently engaging against an aforesaid conductive area of the circuit board, so that the reflector conductive coating on the front of the tab is near to the circuit board conductive area. Preferably, the tab is tapered in thickness so as to be very thin at its free end which is against the circuit board conductive area, to further reduce the spacing between the reflector conductive coating and the circuit board conductive area.

In the above-described embodiments of the invention in which the conductive front surface of the reflector is positioned near to conductive areas of the circuit board (which preferably are electrical ground conductive areas), there is effective electrical connection between the reflector conductive surface and the circuit board conductive areas, insofar as electrostatic charges are concerned, due to inherent capacitive coupling and also due to the electrostatic charge (1000 volts or more, for example, at low energy) readily arcing or discharging across the small space between the circuit board conducting area and the reflector conducting surface, whereby the relatively large area of the reflector conductive surface dissipates the charge into surrounding space so that it will not pass through lamps and cause them to accidentally flash, as is described in the above-referenced patent applications.

The above-referenced patent applications disclose a type of flash array, commercially available and known as the "FlipFlash" array, which can be connected to a camera in two different orientations in each of which only a group of lamps relatively far away from the camera lens axis will be flashed, thereby reducing the likelihood of an undesirable "red-eye" effect which causes a person's pupils to appear red if the flashing lamp is close to the lens axis. The referenced patent applications also disclose flash lamp sequencing circuitry carried on the circuit board and comprising radiation sensitive switches adjacent to the lamps and which respond to radiation from a flashing lamp so as to connect the firing circuit to the next lamp to be flashed. However, radiation switches need not be provided adjacent to the last-to-flash lamps of the two groups, since there are no further lamps to be flashed. In accordance with a feature of the present invention, conductive electrical ground areas are provided on the circuit boards behind the last-to-be-flashed lamp of each group thereof, instead of and at the location where radiation switches would be provided if employed. The aforesaid shaped areas at the back of the reflector are provided in alignment with these electrical ground areas behind the last-to-flash lamps.

BRIEF DESCRIPTION OF THE DRAWING

FIG. 1 is a perspective view of a multiple flash lamp array utilizing a preferred embodiment of the invention.

FIG. 2 is an exploded view of the array of FIG. 1 showing the internal parts.

FIG. 3 is a sectional view taken on the line 3—3 of FIG. 1.

FIG. 4 is a sectionalized perspective view of the array showing the locations of FIGS. 5 and 6.

FIGS. 5 and 6 are perspective views of sections of the array showing embodiments of the invention in detail.

DESCRIPTION OF THE PREFERRED EMBODIMENTS

A multiple flash lamp unit 17 of the planar array type and containing a plurality of electrically fired flash lamps is provided with a plug-in connector tab 18 at the lower end thereof, adapted to fit into a socket of a camera or flash adapter as shown and described in the above-referenced patent applications. The lamp array 17 is provided with a second plug-in connector tab 18' at the top end thereof, whereby the array 17 is adapted to be attached to the camera socket in either of two orientations, i.e., with either the tab 18 or the tab 18' plugged into the socket. The array 17 is provided with an upper group 21 of flash lamps 22, 23, 24, 25, and a lower group 26 of flash lamps 27, 28, 29, and 30, the lamps being arranged in a planar configuration. Reflectors 22', etc., are disposed behind the respective flash lamps, so that as each lamp is flashed, its light is projected forwardly of the array 17. The lamps are arranged and connected so that when the array is connected to a camera by the connector 18, only the upper group 21 of lamps will be flashed, and when the array is turned end for end and connected to the camera by the other connector 18', only the then upper group 26 of lamps will be flashed. By this arrangement, only lamps relatively far from the lens axis are flashable, thus reducing the undesirable red-eye effect, as is more fully described in the above-referenced patent applications.

The general construction of the array, also disclosed in the above-referenced Hanson application, comprises front and back housing members 36 and 37, which preferably are made of plastic and are provided with interlocking members 38 which can be molded integrally with the housing members and which lock the housing members together in final assembly to form a unitary flash array structure. FIG. 3 shows a pair of interlocking members 38a carried at the rear of the side of the front housing member 36 interlocked with a pair of interlocking members 38b of the back housing member 37. In the preferred embodiment shown, the front housing member 36 is a rectangular concavity and the back housing member 37 is substantially flat and includes integral extensions 39 and 39' at the ends thereof which partly surround and protect the connector tabs 18 and 18' and also function to facilitate mechanical attachment to the camera socket. Sandwiched between the front and back housing members 36 and 37, in the order named, are the flash lamps 22, etc., a unitary reflector member 41 (preferably of plastic coated with aluminum on its front surface) shaped to provide the individual reflectors 22', etc., a printed circuit board 42 provided with integral connector tabs 18 and 18', and an indicia sheet 43 which may be provided with instructions, information, trademarks, and other indicia such as flash indicators located behind the respective lamps and which change color due to heat and/or light radiation from a flashing lamp, thus indicating at a glance which of the lamps have been flashed and not flashed.

The indicia sheet 43 may be of paper or thin cardboard and provided with openings where the flash indicators are desired, and flash indicator material, such as a sheet-like heat-sensitive plastic material, for example biaxially oriented polypropylene, which shrinks or melts when subjected to heat or radiant energy from an adjacent flashing lamp thus effectively changing the color of the openings in the indicia sheet 43. For example, the plastic material can be colored green on its back side by ink or other suitable means, and the green disappears and the opening becomes a different color (dark, for example) when the plastic shrinks or melts away due to heat from an adjacent flashing lamp. The front of the plastic (toward the lamps) should be coated with dark ink so as to absorb heat more readily. A single flash indicator sheet 48 may be arranged over all of the flash indicator openings, as is described in the above-referenced Hanson patent application. Openings 51 are provided through the reflector unit 41 and the circuit board 42 to facilitate radiation from flashing lamps reaching the flash indicators. The rear housing member 37 is transparent (either of clear material or provided with window openings) to permit viewing of the indicia on the indicia sheet 43. The front housing member 36 is transparent at least in front of the lamps 22, etc., to permit light from flashing lamps to emerge frontwardly of the array, and may be tinted to alter the color of light from the flash lamps.

The height and width of the rectangular array are substantially greater than its thickness, and the heights and widths of the reflector member 41 and circuit board 42 are substantially the same as the interior height and width of the housing member 36, to facilitate holding the parts in place.

The tab 18, which is integral with the circuit board 42, is provided with a pair of electrical terminals 31 and 32, and similarly the tab 18' is provided with a pair of terminals 31' and 32', for contacting terminals of a camera socket for applying firing voltage pulses to the array. Each tab is provided with a third terminal 33 and 33', respectively, which functions to electrically short the circuitry of the inactive lower group of lamps when the array is plugged into a socket. The terminals 31 and 31' are shown as having a lateral "T-bar" configuration for temporarily shorting the socket terminals while the array is being plugged in, to discharge any residual voltage charge in the firing pulse source, and also to reduce the likelihood of lamps being accidentally flashed by electrostatic voltage when the array is handled, as is disclosed in the abovereferenced Coté patent application Ser. No. 485,460, because these terminals, which are connected to electrical ground in the circuit, are more readily touchable than the other electrically "hot" terminals.

The circuit board 42 has a "printed circuit" thereon, as will be described, for causing sequential flashing of the lamps by firing voltage pulses applied to the terminals 31, 32 or 31', 32'. The top and bottom halves of the printed circuitry preferably are reverse mirror images of each other. The lead wires 22a, 22b, etc., of the lamps 22, etc., may be attached to the circuit board 42 in various ways, such as by means of metal eyelets 22a', 22b', etc., placed through openings in the board. The lead wires 22a, 22b, etc., pass through openings 52 in the reflector member 41 and into or through the respective pairs of eyelets 22a', 22b', etc., and the ends of the eyelets are crimped or bent to hold the lead wires and make electrical contact thereto and also to hold the eyelets in place with their heads in electrical contact with the circuit of the circuit board.

Areas 59 on the transparent front housing member 36 may be made opaque or partly opaque, such as by making the surface roughened at these areas, to fully or partly conceal the lamp lead-in wires 22a, 22b, etc., and/or the lower portions of the lamps, for improved appearance of the array.

The circuit board terminal 32 is part of a conductor run that is electrically connected to lead-in wire 24a of lamp 24 at the eyelet 24a' and terminates at radiation switches 61, 62, and 63 respectively positioned near lamps 24, 25, and 23. A circuit board conductor run 64 is connected electrically to the remaining lead wire of flash lamp 25 at eyelet 25a' and terminates at the radiation switch 61. A circuit board conductor run 65 is connected to the remaining lead-in wire of flash lamp 23 at eyelet 23a' and terminates at the radiation switch 62. Similarly, a circuit board conductor run 66 is connected to the remaining lead-in wire of flash lamp 22 at eyelet 22b' and terminates at radiation switch 63.

The radiation switches 61, 62, 63 are respectively in contact with and bridge across the circuit runs that are connected to them. The material for the radiation switches may be suitable material initially having an open circuit or high resistance, the resistance thereof becoming zero or a low value when the material receives radiation in the form of heat and/or light from a respective adjacent lamp, upon the lamp being flashed. For this purpose, each of the radiation switches is respectively positioned behind and near to a flash lamp 24, 25, 23. Windows in the form of transparent sections or openings 69 may be provided in the reflectors in front of the switches as shown in FIG. 2 to facilitate radiation transfer. A suitable material for the radiation switches is silver oxide dispersed in a binder such as polyvinyl resin. Each of these radiation switches, upon receiving heat and/or light radiation from the adjacent lamp when it is flashed, changes from an open circuit or high resistance to a closed circuit or low resistance between its switch terminals on the circuit board.

As has been explained, the lower portion of the circuit board contains a substantially reverse mirror image of the same circuit shown in the upper part of the circuit board, and therefore will not be described in detail. It will be noted that the circuit runs from the plugged-in terminals 31 and 32 at the lower part of the circuit board extend upwardly so as to activate the circuitry in the upper half of the circuit board. Similarly, when the unit is turned around and tab 18' is plugged into a socket, the circuit board terminals 31' and 32' will be connected to and activate the lamps which then will be in the upper half of the circuit board, and hence in the upper half of the flash unit 17. This accomplishes, as has been stated, the desirable characteristic whereby only the group of lamps relatively farthest away from the lens axis will be flashed, thereby reducing or eliminating the undesirable red-eye effect.

The circuit on the circuit board 42 functions as follows. Assuming that none of the four lamps in the upper half of the unit 17 have been flashed, upon occurrence of a first firing pulse applied across the terminals 31, 32, this pulse will be directly applied to the lead-in wires of the first-connected flash lamp 24, whereupon the lamp 24 flashes and becomes an open circuit between its lead-in wires. Heat and/or light radiation from the flashing first lamp 24 causes the adjacent radiation switch 61 to become a closed circuit (or a low value of resistance), thereby connecting the circuit board terminal 32 electrically to the lead-in wire of the second lamp 25 at eyelet 25a'. By the time this occurs, the firing pulse has diminished to a value insufficient to cause the second lamp 25 to flash. When the next firing pulse occurs, it is applied to the lead-in wires of the second lamp 25, via the now closed radiation switch 61, whereupon the second lamp 25 flashes, thereby causing radiation switch 62 to assume zero or low resistance, and the second lamp 25 now has an open circuit or high resistance between its lead-in wires. When the next firing pulse occurs, it is applied via now closed radiation switch 62 to the third lamp 23, thereby firing the lamp which becomes an open circuit, and the radiation from it causes the radiation switch 63 to become essentially a closed circuit across its terminals. Thus, the next firing pulse will be applied, via now closed radiation switch 63, to the lead-in wires of the fourth flash lamp 22, thereupon causing the lamps to flash. Since this lamp is the last lamp in the active circuit, it does not matter whether its lead-in wires are an open or closed circuit after flashing, and a radiation switch does not need to be provided adjacent to it.

In accordance with the present invention, an electrical ground pad area 67 is provided where a radiation switch would be located, if employed, adjacent to the last-to-flash lamp 22, and is electrically connected to the electrical ground terminal 31' and associated circuit runs. Similarly, an electrical ground pad area 67' is provided where a radiation switch would be located, if employed, adjacent to the last-to-flash lamp 30 of the other group of lamps, and is electrically connected to the electrical ground terminal 31 and associated circuit runs. The ground pads 67 and 67' cooperate with the reflector unit 41 for electrically grounding its front conductive coating, as will be described.

Additional flash lamps, radiation switches, and electrical conductors can be employed, if desired, using the just described principles. When the flash unit is turned around the other connector tab 18' attached to the camera socket, the group of lamps that then become uppermost and relatively farthest away from the lens axis will be in an active circuit and will be flashed in the same manner as has been described. In a preferred embodiment, the lamps 22, etc., are high voltage types, requiring about 2000 volts for example, at low current, for flashing, and they can be fired by impacting or stressing a piezoelectric element in the camera, as disclosed in U.S. Pat. Nos. 2,972,937 and 3,106,080 to C. G. Suits.

As is disclosed in the above-referenced Coté patent applications, it is desirable to electrically connect the conductive reflector unit 41 to the more readily touchable electrical ground terminals 31 and 31' of the array, so that when these terminals are touched by an electrostatically charged person or object, the reflector unit functions as a shield (connected to the terminals 31 and 31') having relatively large stray capacitance to ground, whereby a relatively large amount of the electrostatic voltage will be dissipated to ground (or into space) rather than flowing through the primers or other flash ignition means of the lamp 22, etc. A feasible and economical way of manufacturing the reflector unit 41 is to mold or otherwise shape a plastic material in the desired configuration having a plurality of individually shaped reflector surfaces, and apply a metal coating, such as vapor-deposited aluminum, to the front surface of the reflector unit. A metal coating is unnecessary and undesirable on the rear surface of the reflector unit. The above-referenced Hanson patent application discloses a way of electrically connecting the metal coating on the front of the reflector unit to an electrical ground area of the circuit board, by means of a U-shaped metal clip.

In accordance with the present invention, the conductive front surface of the reflector unit is electrically connected to one or more circuit areas of the circuit board, such as electrical ground areas, by shaping the reflector unit 41 so as to bring its conductive front surface adjacent to or touching one or more circuit areas of the circuit board. In one embodiment, an opening 71 is provided through the back wall of the reflector 22' of the last-to-flash lamp 22 of the group 21 of lamps where an opening 69 would be located if a radiation switch were provided behind the lamp 22, and this opening 71 is over and in alignment with the electrical ground pad 67 of the circuit board. The conductive coating on the front surface of the reflector can be applied in a manner so as to also coat the side wall of the opening 71 so that, with the rear surface of the reflector 22' in contact against the ground pad 67 in the finally assembled array, the conductive coating of the reflector will be brought very close to, or in direct contact with, the ground pad 67. Alternatively, if conductive material is not applied to the side wall of the opening 71, the reflector conductive coating will be spaced from the ground pad 67 by the wall thickness of the reflector unit at the opening 71, which in one practical embodiment is about 0.025 inch. If desired, this wall thickness can be reduced at the opening 71, for example to about 0.01 inch, or a zero thickness if the reflector is tapered. The close spacing of the reflector conductive coating to the ground pad 67 provides an electrical connection therebetween insofar as electrostatic charges are concerned, because they can readily arc or discharge across the space due to their relatively high voltage (1000 volts or more, for example).

As shown in FIG. 5, which is a sectional view through the opening 71 in the reflector 22', taken at the shaded area 72 of FIG. 4, the front surface of the reflector may be provided with a taper 73 so that the reflector wall is very thin, or sharp, at the rim of the opening 71, so that the conductive coating on the front of the reflector will be very close to the electrical ground pad 67. Also, the back of the reflector can be shaped to provide a sharp rearwardly extending rim 74 around the opening 71 which will deform and/or penetrate slightly into the electrical ground pad 67 thus bringing the reflector conductive coating closer to, and in some cases in direct contact with, the ground pad 67. A similar opening can be provided in the last-lamp reflector 30' in the other group 26 of flash lamps, at a location corresponding to the radiation-switch openings 69 in the other reflectors and in alignment with the electrical ground pad 67'.

Another embodiment of the invention is shown in FIG. 6, which is a sectional view through the reflector 30' at the shaded area 76 of FIG. 4. In this embodiment, the reflector is shaped to provide a resilient tab 77 extending somewhat rearwardly so as to engage against the ground pad 67 or 67'. The reflector conductive coating is applied to the front surface of the tab 77, and the tab may be tapered so as to be very thin, or have a sharp edge, at its free end 78, so that the reflector conductive coating will be very close to an electrical ground pad in the final assembly and thus will provide an effective electrical connection between the ground pad and the reflector coating for electrostatic charges.

One or more openings 71 or tabs 77 can be provided in the reflector unit 41, or a combination of openings and tabs can be employed.

It has been found that the invention achieves its objective of providing an electrical connection, for electrostatic charges, between the reflector unit 41 and circuit board 42, and is feasible and economical to manufacture.

While preferred embodiments and modifications of the invention have been shown and described, various other embodiments and modifications thereof will become apparent to persons skilled in the art and will fall within the scope of the invention as defined in the following claims.

What we claim as new and desire to secure by Letters Patent of the United States is:

1. A multiple flash lamp array comprising a plurality of electrically fired flash lamps each having a pair of lead-in conductors, a circuit board containing thereon circuitry for sequentially firing said flash lamps, means electrically connecting said lead-in conductors of the flash lamps to said circuitry, a reflector unit positioned between said lamps and said circuit board and shaped to define individual concave reflectors facing the front thereof for reflecting light from said lamps frontwardly of the array when flashed, said reflector unit comprising electrically insulating material having a coating of electrically conductive material on the front surface thereof, an opening through said reflector unit, and an electrical ground conductive area carried on the front of said circuit board behind and substantially in alignment with at least a portion of the edge of said opening, the rear surface of said reflector unit at said edge of the opening being adjacent to or against said electrical ground conductive area, said conductive coating on the front of the reflector being against or adjacent to said electrical ground conductive area to provide an electrical connection for electrostatic charges between said electrical ground conductive area and said conductive coating on the reflector.

2. An array as claimed in claim 1, in which said opening through the reflector unit is at substantially the deepest part of one of said individual concave reflectors and behind one of said flash lamps.

3. An array as claimed in claim 2, in which the wall thickness of said reflector at said opening is less than about 0.025 of an inch.

4. An array as claimed in claim 2, in which the front surface of said individual reflector having an opening is tapered around said opening to bring said conductive coating on the reflector relatively closer to said conductive area on the circuit board.

5. An array as claimed in claim 4, in which the rear surface of said reflector is provided with a rearwardly projecting sharp rim around said opening and which projects into said conductive area on the circuit board.

6. An array as claimed in claim 1, in which said conductive coating on the reflector extends onto the side wall of said opening.

7. An array as claimed in claim 1, in which said array is provided with a group of connector terminals positioned and arranged so that one of said connector terminals is more readily touched than the rest when the array is handled, and means electrically connecting said readily more touched connector terminal to said conductive area on the circuit board.

8. An array as claimed in claim 7, in which said conductive area on the circuit board is electrically connected to a lead-in wire of each of said flash lamps.

9. An array as claimed in claim 1, in which said opening defines a tab which is integral with the reflector unit and engages against said conductive area on the circuit board.

10. An array as claimed in claim 9, in which said tab is tapered in thickness so as to be relatively thinner at its free end to bring said conductive coating on the reflector relatively closer to said conductive area on the circuit board.

11. An array as claimed in claim 1, in which said circuitry on the circuit board includes radiation switches respectively behind all but the last to be flashed of said lamps, and window means through the reflectors associated with all of said lamps except the last to be flashed and respectively in alignment with said radiation switches, said electrical ground conductive area on the circuit board being positioned at substantially the same relative position behind said last-to-be-flashed lamp as are said radiation switches behind the rest of said lamps, said opening being at substantially the same relative position in the reflector associated with said last-to-be-flashed lamp as are said window means in alignment with said radiation switches in the rest of said reflectors.

12. An array as claimed in claim 11, in which said array has a rectangular shape and is provided with a first electrical connector means at a first end thereof and a second electrical connector means at a second end thereof, said flash lamps, individual reflectors, and circuitry constituting a first group thereof and being positioned in a first half of said array adjacent to said first electrical connector means, means electrically connecting the lamps and circuitry of said first group to said second electrical connector means, said array further comprising a second group of flash lamps, individual reflectors, and circuitry positioned in a second half of said array adjacent to said second electrical connector means and arranged similarly to and substantially in a mirror image of said first group thereof, and means electrically connecting the lamps and circuitry of said second group to said first electrical connector means, said reflectors of said first and second groups being integral with said reflector unit, whereby electrical connections are provided for electrostatic charges between electrical ground areas of the circuit board and the conductive coating on the front of the reflector unit at the reflectors associated with the last-to-be-flashed lamp in each of said first and second groups thereof.

* * * * *